(12) United States Patent
Shen

(10) Patent No.: US 10,624,181 B1
(45) Date of Patent: *Apr. 14, 2020

(54) INFRARED BASED CONTROLLER FOR RGB LAMP STRIP

(71) Applicant: NINGBO GOLDEN POWER ELECTRONIC CO., LTD., Ningbo (CN)

(72) Inventor: Zhengxian Shen, Ningbo (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/354,706

(22) Filed: Mar. 15, 2019

(30) Foreign Application Priority Data

Nov. 23, 2018 (CN) .................... 2018 2 1939551 U

(51) Int. Cl.
*H05B 37/02* (2006.01)
*H05B 33/08* (2020.01)

(52) U.S. Cl.
CPC ....... *H05B 37/0272* (2013.01); *H05B 33/089* (2013.01); *H05B 33/0857* (2013.01)

(58) Field of Classification Search
None
See application file for complete search history.

(56) References Cited

U.S. PATENT DOCUMENTS

| 8,543,249 B2* | 9/2013 | Chemel | H05B 37/0272 351/51 |
| 8,823,277 B2* | 9/2014 | Chemel | H05B 37/029 315/152 |
| 8,876,325 B2* | 11/2014 | Lu | G02B 19/0066 362/217.02 |
| 8,941,306 B2* | 1/2015 | Ayres | H05B 33/0854 315/149 |
| 9,041,310 B2* | 5/2015 | Lin | H05B 33/0887 315/247 |
| 9,072,133 B2* | 6/2015 | Chemel | F21S 2/005 |
| 9,366,410 B2* | 6/2016 | Lu | G02B 19/0066 |
| 9,602,016 B2* | 3/2017 | Freeman | H02M 3/33546 |
| 9,655,217 B2* | 5/2017 | Recker | H05B 37/0272 |
| 9,750,116 B2* | 8/2017 | Witzgall | F21S 6/002 |
| 9,780,674 B2* | 10/2017 | Freeman | H02M 3/33546 |
| 9,839,103 B2* | 12/2017 | Avrahamy | C02F 1/42 |
| 9,860,965 B2* | 1/2018 | Recker | H05B 37/0272 |
| 9,867,263 B2* | 1/2018 | Avrahamy | H05B 39/086 |
| 9,955,551 B2* | 4/2018 | Spero | B60Q 1/04 |
| 10,034,359 B2* | 7/2018 | Recker | H05B 37/0272 |
| 10,197,224 B1* | 2/2019 | Macias | F21K 9/278 |
| 10,250,329 B1* | 4/2019 | Pederson | H04B 10/40 |
| 10,278,268 B2* | 4/2019 | Casey | G06K 9/2027 |

(Continued)

*Primary Examiner* — Alexander H Taningco
*Assistant Examiner* — Srinivas Sathiraju
(74) *Attorney, Agent, or Firm* — W&K IP

(57) ABSTRACT

The present disclosure discloses an infrared based controller for a RGB lamp strip disposed between a power source and the lamp strip. The controller comprises a first reverse protection unit, electrically connected to the power source, an infrared receiving unit electrically connected to the first reverse protection unit for receiving an infrared signal transmitted by an external infrared terminal. The control of the lamp strips by infrared and manual means is realized by the controller, and the user can switch between seven monochrome modes and the eight colored modes of the lamp strip through an infrared terminal.

16 Claims, 3 Drawing Sheets

(56) References Cited

U.S. PATENT DOCUMENTS

| | | | |
|---|---|---|---|
| 2007/0086755 A1* | 4/2007 | Dang | H02P 5/46 |
| | | | 388/804 |
| 2007/0137075 A1* | 6/2007 | Dang | H02P 5/46 |
| | | | 40/431 |
| 2012/0098439 A1* | 4/2012 | Recker | H05B 33/0815 |
| | | | 315/152 |
| 2012/0206050 A1* | 8/2012 | Spero | B60Q 1/04 |
| | | | 315/152 |
| 2012/0235579 A1* | 9/2012 | Chemel | F21S 2/005 |
| | | | 315/152 |
| 2014/0139111 A1* | 5/2014 | Lin | H05B 33/0887 |
| | | | 315/122 |
| 2016/0099596 A1* | 4/2016 | Chien | H02J 7/0052 |
| | | | 368/10 |
| 2016/0116925 A1* | 4/2016 | Freeman | H02M 3/33546 |
| | | | 307/130 |
| 2016/0118905 A1* | 4/2016 | Freeman | H02M 3/33546 |
| | | | 363/21.1 |
| 2016/0118906 A1* | 4/2016 | Freeman | H02M 3/33546 |
| | | | 363/21.05 |
| 2016/0126852 A1* | 5/2016 | Freeman | H02M 3/33546 |
| | | | 363/21.05 |
| 2016/0134198 A1* | 5/2016 | Freeman | H02M 3/33546 |
| | | | 363/21.05 |
| 2017/0086281 A1* | 3/2017 | Avrahamy | C02F 1/42 |
| 2017/0099011 A1* | 4/2017 | Freeman | H02M 7/06 |
| 2017/0265287 A1* | 9/2017 | Avrahamy | C02F 1/42 |
| 2018/0226367 A1* | 8/2018 | Babcock | F21V 23/006 |
| 2019/0215923 A1* | 7/2019 | Shen | H05B 33/0842 |

* cited by examiner

INFRARED BASED CONTROLLER FOR RGB LAMP STRIP

CROSS-REFERENCE TO RELATED APPLICATIONS

This application claims priority to Chinese Patent Application No. 201821939551.4 with a filing date of Nov. 23, 2018. The content of the aforementioned application, including any intervening amendments thereto, are incorporated herein by reference.

TECHNICAL FIELD

The present disclosure related to the field of controllers, and more particularly to an infrared based controller for a RGB lamp strip.

BACKGROUND

The RGB lamp strip provides various light-emitting effects by utilizing the different currents accessed by the lamp strip to change the colors and the color switching frequency of the lamp strip. In practical applications, it is still a problem to be solved to combine infrared features with the controller so that a remote controller can be used to adjust the color changing effects of the RGB lamp strip.

SUMMARY

The present disclosure discloses an infrared based controller for a RGB lamp strip disposed between a power source and the lamp strip. The controller comprises a first reverse protection unit, electrically connected to the power source, an infrared receiving unit electrically connected to the first reverse protection unit for receiving an infrared signal transmitted by an external infrared terminal, a control unit electrically connected to the first reverse protection unit and the infrared receiving unit for receiving the infrared signal and issuing a control signal according to the infrared signal, a color adjustment unit electrically connected to the first reverse protection unit and the control unit for adjusting a flicker color and a flicker frequency of the lamp strip according to the control signal, a voltage stabilizing unit electrically connected to the first reverse protection unit, the control unit and the color adjustment unit, respectively, for performing voltage stabilization processing on the control unit and the color adjustment unit, and a second reverse protection unit, disposed between the color adjustment unit and the lamp strip. The color adjustment unit is composed of a MOS transistor Q1, gates of the MOS transistor Q1 are electrically connected to the control unit and the first reverse protection unit, respectively, a source of the MOS transistor Q1 is electrically connected to the first reverse protection unit, and a drain of the MOS transistor Q1 is electrically connected to the second reverse protection unit.

In one embodiment, the control unit is composed of a control chip U1, a power supply pin of the control chip U1 is electrically connected to the first reverse protection unit, a signal input pin of the control chip U1 is coupled to an output terminal of the infrared receiving unit, and an output pin of the control chip U1 is electrically coupled to the color adjustment unit.

In one embodiment, the infrared receiving unit is composed of an infrared receiving chip QP1, an output pin of the infrared receiving chip QP1 is electrically connected to a signal input pin of the control unit, the input pin is connected to the first reverse protection circuit, and a second pin is grounded.

In one embodiment, the voltage stabilizing unit is composed of a voltage stabilizing chip U2.

In one embodiment, the controller further includes a manual control unit including a button SW1 that is connected at one end to a manual signal input pin of the control chip U1 and at the other end to a ground.

In one embodiment, the control chip U1 is further electrically connected to a crystal oscillator circuit.

In one embodiment, the control chip U1 is further electrically connected to a crystal oscillator circuit, the second reverse protection circuit includes a resistor R4, a capacitor C2 and a diode D3 connected in parallel, the anode of the diode D3 is connected to the source of the MOS transistor Q1, and the lamp strip is connected in parallel with the diode D3.

In one embodiment, the first reverse protection circuit includes a diode D1 having one end connected to the power supply and the other end grounded, and a Zener diode ZD1 and a capacitor C6 connected in parallel with the diode D1, anodes of the diode D1 and the Zener diode ZD1 are grounded, and the Zener diode ZD1 is connected in series with a resistor R3.

In one embodiment, a power plug is disclosed which comprises the controller of any of the previous embodiments, and a housing and a power converter disposed inside the housing. The controller is disposed in the housing, and the power converter is electrically coupled to the controller.

The above technical solution has the following benefits or advantages: In the above-mentioned infrared-based RGB lamp strip controller, the control of the strip is realized by infrared and manual means. The user can switch between seven types of monochrome modes and eight types of colored modes by either the infrared terminal or the button.

BRIEF DESCRIPTION OF THE DRAWINGS

Embodiments of the present disclosure are described more fully with reference to the accompanying drawings. The drawings are, however, to be construed as illustrative and not restriction.

REFERENCE LABELS 1, first reverse protection unit; 2, infrared receiving unit; 3, control unit; 4, color adjustment unit; 5, voltage stabilizing unit; 6, second reverse protection unit; 7, manual control unit; 21 housing; 22 power converter; 23 controller.

DETAILED DESCRIPTION

The concept of the present disclosure will be described below using terms commonly used by those skilled in the art to convey the substance of their work to others skilled in the art. However, these concepts of the disclosure may be embodied in many different forms and should not be construed as limited to the embodiments described herein. These embodiments are provided to make the disclosure more complete and thorough, and to fully convey the scope of the disclosure to those skilled in the art. It should also be noted that these embodiments are not mutually exclusive. Components, steps or elements from one embodiment may be assumed to exist or be used in another embodiment. The particular embodiments shown and described may be substituted for a variety of alternatives and/or equivalent implementations without departing from the scope of the embodiments of the present disclosure. This application is intended to cover any adaptations or variations of the embodiments discussed herein. It will be apparent to those skilled in the art that the alternative embodiments may be practiced using only some of the described aspects. The specific figures, materials, and configurations are described herein for purposes of illustration, and may be practiced by those skilled in the art without the specific details. In other instances, well-known features may be omitted or simplified so as not to obscure the illustrative embodiments.

Moreover, the terms "first," "second," and "third" are used for descriptive purposes only and are not to be construed as indicating or implying relative importance. Unless specifically stated and limited, the terms "provided", "mounted", "connected", and "coupled" are to be understood broadly, and may be, for example, a fixed connection, a detachable connection, or an integral connection; it can be a mechanical connection or an electrical connection; it can be directly connected or indirectly connected through an intermediate medium, which can be the internal connection of the two elements. The term "fixing" may be welding or screwing or snapping. The specific meanings of the above terms in the present disclosure can be understood by those skilled in the art in specific cases.

The infrared based controller for a RGB lamp strip according to the present disclosure would be described hereinafter in conjunction with the accompanying drawings and embodiments.

Figure 1:
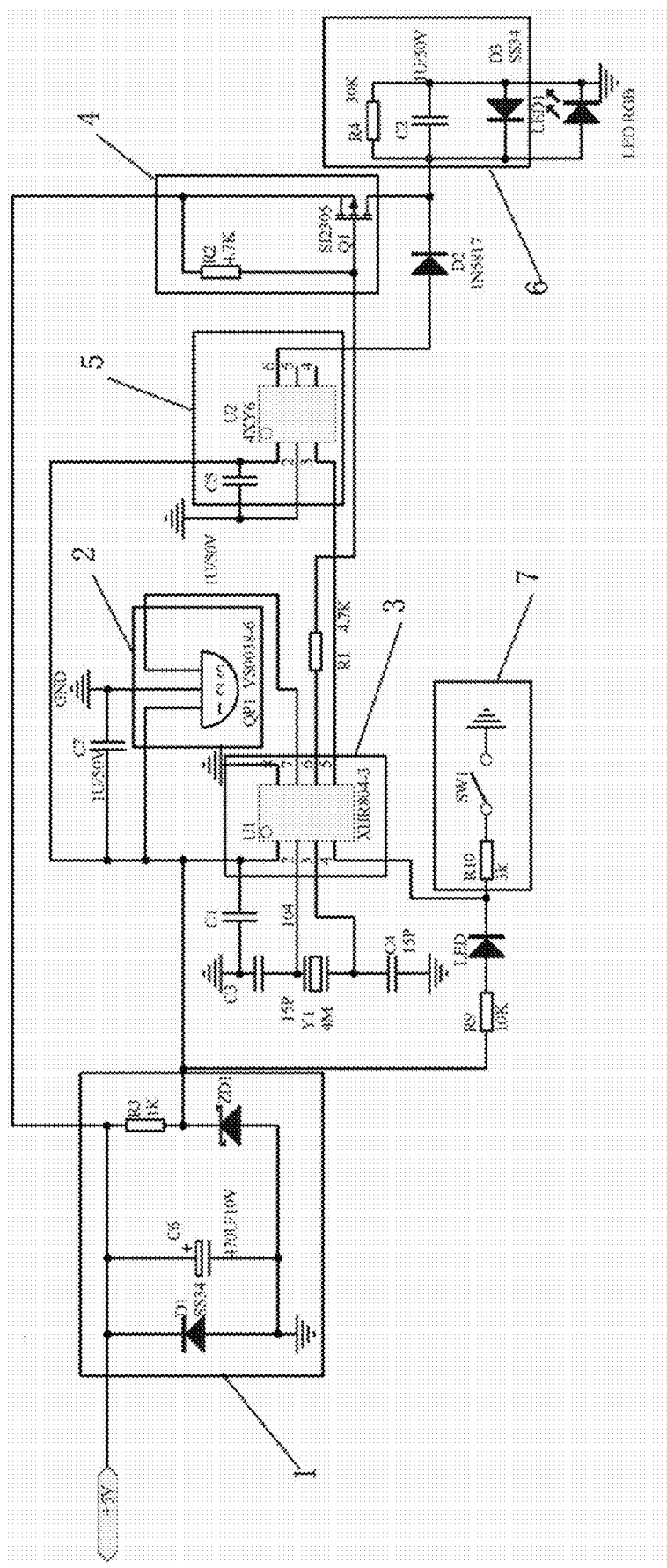
FIG. 1 is a circuit diagram of a controller for an RGB lamp strip based on infrared mechanism according to an embodiment.
Figure 2:
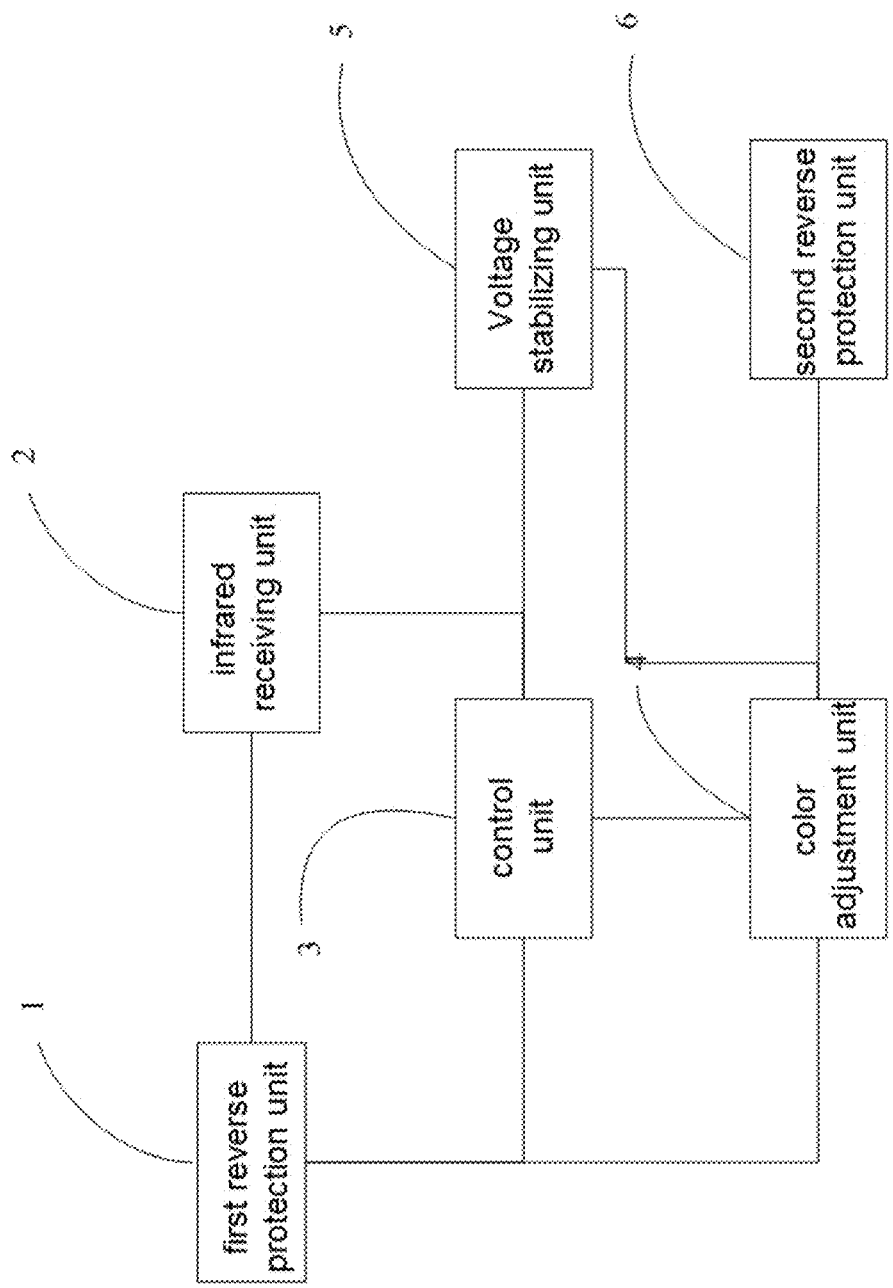
FIG. 2 is a block diagram of a controller for an RGB lamp strip based on infrared mechanism according to an embodiment.
Figure 3:
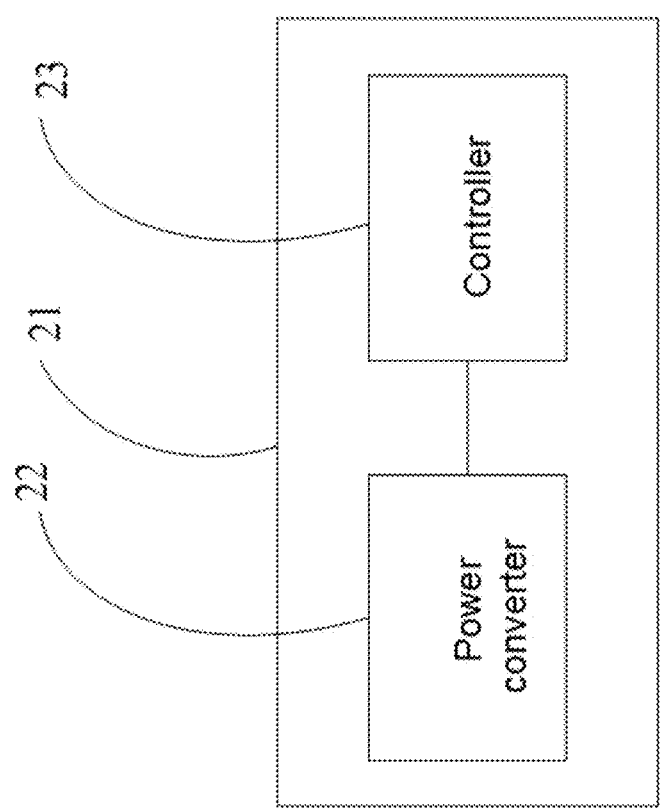
FIG. 3 is a block diagram of a power plug for an RGB lamp strip based on infrared mechanism according to an embodiment.

As shown in FIG. 1, an infrared based controller for a RUB lamp strip is disposed between a power source and the lamp strip. The controller comprises:

a first reverse protection unit 11, electrically connected to the power source to prevent reverse connection, i.e., to conduct for the controller D1 to lower the input voltage and protect the controller if the power source is reversely connected; an infrared receiving unit 2 electrically connected to the first reverse protection unit for receiving an infrared signal transmitted by an external infrared terminal;

a control unit electrically 3 connected to the first reverse protection unit 1 and the infrared receiving unit 2 for receiving the infrared signal and issuing a control signal according to the infrared signal;

a color adjustment unit 4 electrically connected to the first reverse protection unit 1 and the control unit 3 for adjusting a flicker color and a flicker frequency of the lamp strip according to the control signal;

a voltage stabilizing unit 5 electrically connected to the first reverse protection unit 1, the control unit 3 and the color adjustment unit 4, respectively, for performing voltage stabilization processing on the control unit 3 and the color adjustment unit 4; and a second reverse protection unit 6, disposed between the color adjustment unit 4 and the lamp strip to prevent damage to the lamp strip and the controller caused by a reversely connected power source.

Specifically, in the above-described infrared based controller for the RGB lamp strip, the current is supplied to the infrared receiving unit 2, the control unit 3, the color adjusting unit 4, and the voltage stabilizing unit 5 via the first reverse protection unit 1. When the infrared receiving unit 2 receives the infrared signal, the signal is transmitted to the control unit 3. The control unit 3 analyzes the infrared signal to obtain a control signal, and sends the control signal to the color adjusting unit 4, and the color adjusting unit 4 adjusts the voltage magnitude and the conversion frequency to change the flicker color and flicker change of the strip according to the control signal.

In a further embodiment, the control unit 3 is the control chip U1. Preferably, the control chip U1 is of the type XHR-804-3. The first pin (input pin) of the control chip is electrically connected to the first reverse protection unit 1, and the seventh pin (signal input pin) is connected to the output of the infrared receiving unit 2 to receive the infrared signal. Further, the sixth pin (output pin) of the control chip U1 is electrically connected to the color adjustment unit 4 to output a control signal to the color adjustment unit 4.

In a further embodiment, the color adjustment unit 4 is composed of a MOS transistor Q1. Gates of the MOS transistor Q1 are electrically connected to the control chip U1 and the first reverse protection unit 1, respectively. A resistor R1 is arranged between the gates of the MOS transistor Q1 and the output pin of the control chip U1. A resistor R2 is arranged between the gates of the MOS transistor Q1 and the output pin of the control chip U1. A source of the MOS transistor Q1 is electrically connected to the first reverse protection unit 1, and a drain of the MOS transistor Q1 is electrically connected to the second reverse protection unit 6. Specifically, the different control signals correspond to the magnitude and frequency of the voltage input by the control chip U1 to the gates of the MOS transistor Q1, thereby controlling the voltage supplied from the drain of the MOS transistor Q1 to the second reverse protection unit and the lamp strip. The provided voltage and frequency can be different to control the color of the lamp strip and the frequency of flicker.

In a further embodiment, the infrared receiving unit 2 is composed of an infrared receiving chip QP1. Preferably, the signal of the infrared receiving chip QP1 is VS0038-6. The output pin (third pin) of the infrared receiving chip QP1 is electrically connected to the seventh pin of the MOS transistor Q1 to realize signal transmission. The first pin (input pin) of the infrared receiving chip QP1 is connected to the first reverse protection circuit, and the second pin is grounded. In addition, a capacitor C7 is further disposed between the second pin and the first pin.

In a further embodiment, the first reverse protection unit 1 includes a diode D1 having one end connected to the power supply and the other end grounded, and a Zener diode ZD1 and a capacitor C6. The anode of the diode D1 is grounded, and the Zener diode ZD1 is connected in series with a resistor R3. This connection method can lower the input voltage when the power supply is reversely connected, and protect the entire controller and the lamp strip to improve the safety and reliability of the entire controller. A first pin connected to the control chip U1 and a first pin of the infrared receiving chip QP1 are connected between the Zener diode ZD1 and the resistor R3.

In a further embodiment, a crystal oscillator circuit is further disposed between the second pin and the third leg of the control chip U1, and the crystal oscillator circuit is composed of a Zener diode Y1, a capacitor C3 and a capacitor C4, and further, the first pin of the control chip U1 is also grounded through capacitor C1.

Further, the above controller further includes a manual control unit 7, which includes a button SW1. One end of the button SW1 is connected to the fourth pin (manual signal input pin) of the control chip U1, and the other end is grounded. When the user presses the button SW1, each press is equivalent to inputting a control signal once, and the control chip U1 performs a change on the voltage outputted from the sixth pin, thereby performing the adjustment of the lamp strip. In addition, the fourth pin of the control chip U1 is also connected to the first reverse protection unit 1 through a diode LED and a resistor R9. When the controller enters the timing mode, the diode LED illuminates to remind the user.

Further, according to the type of the control chip U1, the controller can be divided into two types: one with memory and one without memory. If the memory is equipped, the mode before the last power-off is memorized after power-on. When there is no memory, the power-on default is a color band mode.

In a further embodiment, the second reverse protection unit 6 includes a resistor R4, a capacitor C2 and a diode D3 connected in parallel. The anode of the diode D3 is connected to the drain of the MOS transistor Q1. The lamp strip is connected in parallel with the diode D3. Preferably, the lamp strip is a light-emitting diode LED1.

In a further embodiment, the voltage stabilizing unit 5 is composed of a voltage stabilizing chip U2. The preferred type of the voltage stabilizing chip U2 is 4XY6. The first pin of the voltage stabilizing chip and the output end of the first reverse protection unit 1 are connected. The third lead is connected to the fifth pin of the control chip U1, and the sixth pin is connected to the drain of the MOS transistor Q1 through the diode D2.

Display of seven monochrome modes and eight multi-color modes in the lamp strip can be realized by the controller. Among them, the monochrome modes include: normal illumination, fade-in, fade-out, blinking, blossom, round trip, fireworks, meteors and flowing. Each of the monochrome modes corresponds to one color, and the seven colors are red, orange (yellow-green), green, blue (blue-green), blue, purple (red-blue), and white (red, green, and blue). The eight modes of color are: six-color jump, six-color gradient, six-color random blinking, RGB blinking, six-color round trip, six-color flicker, rainbow meters and colored band. As the button SW1 is pressed, the controller controls the lamp strip to switch between eight modes which include an automatic cycle, a wave advancement, a double-lamp round trip, single lamp fade-out, flicker round trip, all-lamp flicker, blinking lamp and full illumination. It is worth pointing out that when the illumination intensity of the lamp strip is gradually lowered and repeated repeatedly at a certain period or frequency, a breathing effect of the lamp strip is achieved. In addition, when the lamp strip is illuminated, one or more of the LED lights may suddenly increase in illumination intensity (significantly higher than other LED lights) to enter a jumper pattern. The jumper pattern can appear at a certain frequency.

In addition, the matching infrared terminal, such as an infrared remote control, can control the timing of the lamp strip on/off. The usual setting modes include 2H/4H/6H/8H on and off modes.

In the above-mentioned infrared-based RGB lamp strip controller, the control of the lamp strip by infrared and manual means is realized, and the user can realize the switching of the seven monochrome modes and the eight colors of the lamp strip through the infrared terminal at his or her convenience. In addition, fifteen modes can be switched by pressing the button.

As another embodiment, the present application further provides a power plug, which includes a housing 21 and a power converter 22 disposed inside the housing 21 and electrically connected to the controller 23. The power plug is directly connected to a socket to power the LED lights and control the LED lamp strip.

Various changes and modifications will no doubt become apparent to those skilled in the art. Accordingly, the appended claims are intended to cover all such modifications and modifications. The scope and content of any and all equivalents of the appended claims are intended to be within the scope and spirit of the invention.

I claim:

1. An infrared based controller for a RGB lamp strip disposed between a power source and the lamp strip, the controller comprising:
a first reverse protection unit, electrically connected to the power source;
an infrared receiving unit electrically connected to the first reverse protection unit for receiving an infrared signal transmitted by an external infrared terminal;
a control unit electrically connected to the first reverse protection unit and the infrared receiving unit for receiving the infrared signal and issuing a control signal according to the infrared signal;
a color adjustment unit electrically connected to the first reverse protection unit and the control unit for adjusting a flicker color and a flicker frequency of the lamp strip according to the control signal;
a voltage stabilizing unit electrically connected to the first reverse protection unit, the control unit and the color adjustment unit, respectively, for performing voltage stabilization processing on the control unit and the color adjustment unit; and
a second reverse protection unit, disposed between the color adjustment unit and the lamp strip;
wherein the color adjustment unit is composed of a MOS transistor, gates of the MOS transistor are electrically connected to the control unit and the first reverse protection unit, respectively, a source of the MOS transistor is electrically connected to the first reverse protection unit, and a drain of the MOS transistor is electrically connected to the second reverse protection unit.

2. The controller according to claim 1, wherein the control unit is composed of a control chip, a power supply pin of the control chip is electrically connected to the first reverse protection unit, a signal input pin of the control chip is coupled to an output terminal of the infrared receiving unit, and an output pin of the control chip is electrically coupled to the color adjustment unit.

3. The controller according to claim 2, wherein the infrared receiving unit is composed of an infrared receiving chip, an output pin of the infrared receiving chip is electrically connected to a signal input pin of the control unit, the input pin is connected to the first reverse protection circuit, and a second pin is grounded.

4. A power plug comprising the controller of claim 3, and a housing and a power converter disposed inside the housing, wherein the controller is disposed in the housing, and the power converter is electrically coupled to the controller.

5. The controller according to claim 2, wherein the voltage stabilizing unit is composed of a voltage stabilizing chip.

6. A power plug comprising the controller of claim 5, and a housing and a power converter disposed inside the housing, wherein the controller is disposed in the housing, and the power converter is electrically coupled to the controller.

7. The controller according to claim 2, wherein the controller further includes a manual control unit including a button that is connected at one end to a manual signal input pin of the control chip and at the other end to a ground.

8. A power plug comprising the controller of claim 7, and a housing and a power converter disposed inside the housing, wherein the controller is disposed in the housing, and the power converter is electrically coupled to the controller.

9. The controller according to claim 2, wherein the control chip is further electrically connected to a crystal oscillator circuit.

10. A power plug comprising the controller of claim 9, and a housing and a power converter disposed inside the housing, wherein the controller is disposed in the housing, and the power converter is electrically coupled to the controller.

11. The controller according to claim 1, wherein the control chip is further electrically connected to a crystal oscillator circuit, the second reverse protection circuit includes a resistor, a capacitor and a diode connected in parallel, the anode of the diode is connected to the source of the MOS transistor, and the lamp strip is connected in parallel with the diode.

12. A power plug comprising the controller of claim 11, and a housing and a power converter disposed inside the housing, wherein the controller is disposed in the housing, and the power converter is electrically coupled to the controller.

13. The controller according to claim 1, wherein the first reverse protection circuit includes a diode having one end connected to the power supply and the other end grounded, and a Zener diode and a capacitor connected in parallel with the diode, anodes of the diode and the Zener diode are grounded, and the Zener diode is connected in series with a resistor.

14. A power plug comprising the controller of claim 13, and a housing and a power converter disposed inside the housing, wherein the controller is disposed in the housing, and the power converter is electrically coupled to the controller.

15. A power plug comprising the controller of claim 2, and a housing and a power converter disposed inside the housing, wherein the controller is disposed in the housing, and the power converter is electrically coupled to the controller.

16. A power plug comprising the controller of claim 1, and a housing and a power converter disposed inside the housing, wherein the controller is disposed in the housing, and the power converter is electrically coupled to the controller.

* * * * *